(12) United States Patent
Nakamoto et al.

(10) Patent No.: US 8,848,138 B2
(45) Date of Patent: Sep. 30, 2014

(54) LIQUID CRYSTAL DISPLAY DEVICE

(75) Inventors: Hiroshi Nakamoto, Chiba (JP);
Mitsuhiro Sugiyama, Chosei-gun (JP);
Masahiro Ito, Mobara (JP)

(73) Assignees: Japan Display Inc., Tokyo (JP);
**Panasonic Liquid Crystal Display Co.,
Ltd.**, Hyogo-ken (JP)

( * ) Notice: Subject to any disclaimer, the term of this patent is extended or adjusted under 35 U.S.C. 154(b) by 796 days.

(21) Appl. No.: 13/116,048

(22) Filed: May 26, 2011

(65) Prior Publication Data

US 2011/0292318 A1    Dec. 1, 2011

(30) Foreign Application Priority Data

May 27, 2010    (JP) .................. 2010-121967

(51) Int. Cl.
*G02F 1/1335*    (2006.01)
*F21V 8/00*    (2006.01)

(52) U.S. Cl.
CPC ........ *G02B 6/0016* (2013.01); *G02F 1/133615* (2013.01); *G02B 6/0028* (2013.01); *G02B 6/0038* (2013.01)
USPC .............................................. 349/66; 349/62

(58) Field of Classification Search
USPC ....................................................... 349/62, 66
See application file for complete search history.

(56) References Cited

FOREIGN PATENT DOCUMENTS

| JP | 07-043710 | 2/1995 |
|---|---|---|
| JP | 2005-251687 | 9/2005 |
| JP | 2006-324169 | 11/2006 |
| JP | 2007-194214 | 8/2007 |

*Primary Examiner* — Phu Vu
(74) *Attorney, Agent, or Firm* — Antonelli, Terry, Stout & Kraus, LLP.

(57) ABSTRACT

Provided is a liquid crystal display device includes an optical switching member; a light guide plate made of a thermoplastic material, which includes at least one light introducing portion on at least one side surface thereof; and a light source disposed on the at least one side surface, in which: the at least one light introducing portion includes, in plan view of the light guide plate: a first portion extending from a light incident surface, which is an end surface of the at least one light introducing portion, while keeping a substantially constant width; and a second portion, which extends from the first portion and has a form which widens; and at least the second portion is connected to a front surface of the light guide plate through an inclined surface which is smoothly continuous with the front surface of the light guide plate.

4 Claims, 11 Drawing Sheets

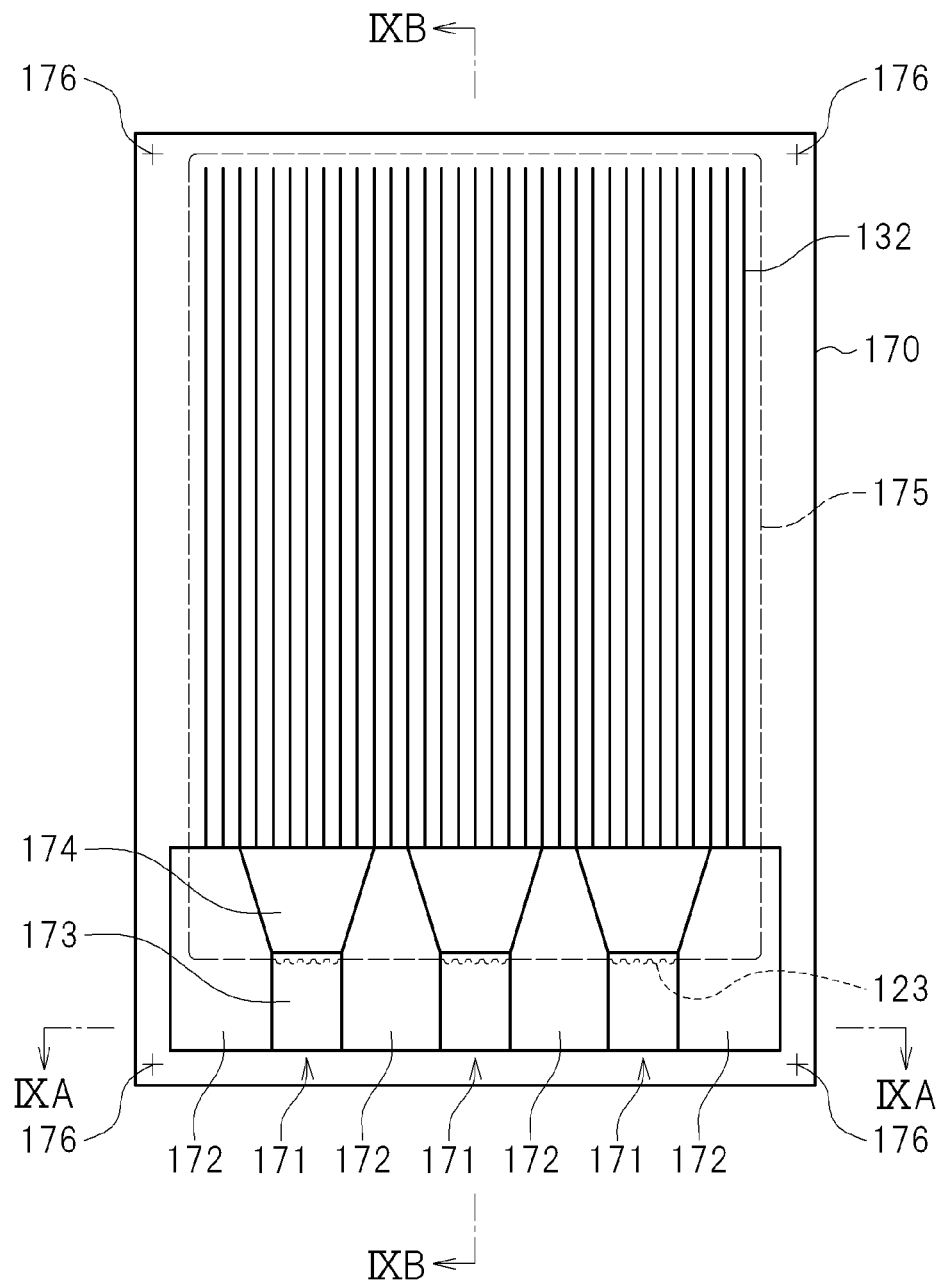

LIQUID CRYSTAL DISPLAY DEVICE

CROSS-REFERENCE TO RELATED APPLICATION

The present application claims priority from Japanese application JP 2010-121967 filed on May 27, 2010, the content of which is hereby incorporated by reference into this application.

BACKGROUND OF THE INVENTION

1. Field of the Invention

The present invention relates to a liquid crystal display device.

2. Description of the Related Art

In recent years, liquid crystal display devices are widely used as information display devices for portable devices. In order to reduce the size of the portable devices, the liquid crystal display devices need to be reduced in entire thickness. However, the liquid crystal display device is not self-luminous, and hence a planar lighting unit called "backlight" is often required. It is known that the liquid crystal display device used for portable devices employs a system, as a planar lighting unit, in which a light source is provided on a side surface of a light guide plate for the purpose of reducing the thickness of the backlight. In the planar lighting unit as described above, the light guide plate is provided with an appropriate structure for uniformly scattering light introduced from the side surface onto the front surface thereof. Further, in the planar lighting unit as described above, there must be given a consideration to the avoidance of undesired light from being reflected on a screen.

For example, JP 07-43710 A discloses a liquid crystal display device, in which a light guide plate is provided with a plurality of grooves on a surface thereof, the plurality of grooves each having projections projecting outward on both sides of the aperture of the groove. According to the invention disclosed in JP 07-43710 A, light which has entered the projections goes outside to be diffusely reflected by a reflective member, and then enters the light guide plate again.

Meanwhile, JP 2005-251687 A discloses a liquid crystal display device, in which light sources are provided on a side surface of a light guide plate, and a light blocking member is provided on a flexible printed circuit board so as to prevent a color of the flexible printed circuit board from being mixed with colors on a screen.

In general, a light guide plate is made of a transparent thermoplastic resin, such as polycarbonate or polymethylmethacrylate, and is formed through projection molding. However, when the projection molding method is employed, it has been difficult to obtain a light guide plate with a thickness smaller than a certain degree, for example, the thickness of 1 mm or less, due to the reason that the resin is insufficiently filled into the mold or it is difficult to remove the finished product from the mold. For that reason, the applicant of the present invention is considering adding a surface structure on a surface of a sheet made of a thermoplastic material by transfer with the use of a mold. At this time, an appropriate structure which scatters light is formed on the surface of the sheet made of the thermoplastic material described above. At the same time, a light introducing structure is formed thereon, which guides light introduced from the side surface of the light guide plate inside the light guide plate. After that, a periphery portion of the sheet made of the thermoplastic material is cut out by a method such as punching, to thereby obtain a light guide plate with a desired dimension.

However, in the method described above, the dimension accuracy in the cutout process by a method such as punching is not always high, and the geometric position at the end surface of the light introducing structure may be easily misaligned. Therefore, when the liquid crystal display device is assembled, light from a light source such as a light-emitting diode (LED) cannot be sufficiently introduced into the light introducing structure, and there is a fear that the use efficiency of the light from the light source is decreased.

SUMMARY OF THE INVENTION

The present invention has been made in view of the above-mentioned circumstances, and it is an object of the present invention to provide a liquid crystal display device including a light guide plate which is obtained by cutting out a periphery portion of a sheet made of a thermoplastic material by a method such as punching and which can sufficiently introduce light from a light source into a light introducing structure.

Among aspects of the invention disclosed in the present application, the representative ones are briefly described as follows.

(1) A liquid crystal display device includes: an optical switching member which includes a first substrate and a second substrate sandwiching a liquid crystal layer; a light guide plate made of a thermoplastic material, which is disposed on a back side of the optical switching member and includes at least one light introducing portion on at least one side surface thereof; and a light source disposed on the at least one side surface of the light guide plate, in which: the at least one light introducing portion includes, in plan view of the light guide plate: a first portion extending from a light incident surface, which is an end surface of the at least one light introducing portion, in a direction away from the light source while keeping a substantially constant width; and a second portion, which extends from the first portion and has a form which widens in the direction away from the light source; and at least the second portion is connected to a front surface of the light guide plate through an inclined surface which is smoothly continuous with the front surface of the light guide plate.

(2) In the liquid crystal display device as described in Item (1) of the present invention, the first portion has a side surface inclined in a direction in which a width of the first portion decreases toward the front surface direction of the light guide plate.

(3) In the liquid crystal display device as described in Item (1) or (2) of the present invention, the first portion has a thickness which is substantially constant.

(4) In the liquid crystal display device as described in any one of the Items (1) to (3) of the present invention: the at least one light introducing portion includes a plurality of light introducing portions; and the liquid crystal display device further includes a light non-introducing portion provided in one of a portion sandwiched by the plurality of light introducing portions and a portion sandwiched by one of the plurality of light introducing portions and an edge portion of the light guide plate, the light non-introducing portion being thinner than the light introducing portion.

According to the invention disclosed in the present application as described above, it is possible to obtain the liquid crystal display device including the light guide plate which is obtained by cutting out the peripheral portion of the sheet made of the thermoplastic material by a method such as punching and which can sufficiently introduce the light from the light source into the light introducing structure.

BRIEF DESCRIPTION OF THE DRAWINGS

In the accompanying drawings:

FIG. 8 is a schematic plan view of a sheet made of a thermoplastic material in a middle of manufacturing the light guide plate;

DETAILED DESCRIPTION OF THE INVENTION

In the following, a preferable embodiment of the present invention is described with reference to the accompanying drawings.

Figure 1:
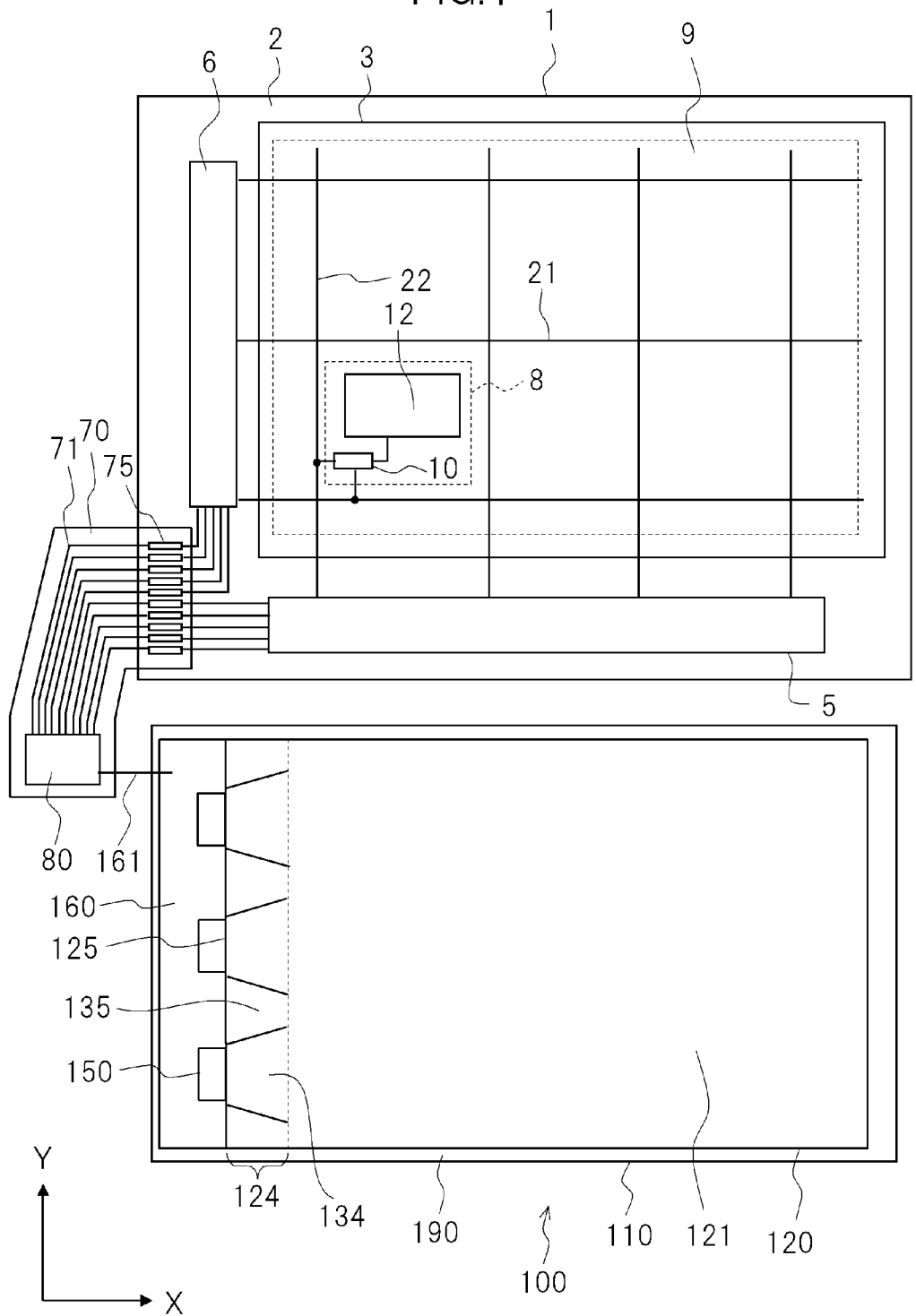
FIG. 1 is a plan view illustrating a liquid crystal display device according to an embodiment of the present invention.

FIG. 1 is a plan view illustrating a liquid crystal display device 100 according to this embodiment. The liquid crystal display device 100 includes an optical switching member 1, a backlight 110, and a control circuit 80. Signals required for display on the liquid crystal display device 100 and a power supply voltage are supplied from the control circuit 80. The control circuit 80 is mounted on flexible printed circuits 70, and signals are delivered to the optical switching member 1 via wiring 71 and a terminal 75.

The backlight 110 includes a light guide plate 120, a light-emitting diode 150 which is a light source, and a housing 190. The backlight 110 is provided to irradiate the optical switching member 1 with light. In the optical switching member 1, displays are performed by controlling an amount of transmitted light which is radiated from the backlight 110. The backlight 110 is provided in an overlaid state on the optical switching member 1 when viewed from a viewer, but in FIG. 1, the backlight 110 is juxtaposed with the optical switching member 1 for ease in understanding. Note that, hereinafter in this specification, a direction in which the liquid crystal display device 100 faces a viewer is referred to as front side while a direction opposite thereto is referred to as back side, and a surface of the liquid crystal display device 100 on the front side is referred to as front surface while another surface thereof on the back side is referred to as back surface. The backlight 110 is generally disposed on the back side of the optical switching member 1, whereas the backlight 110 may be disposed on the front side alternatively. When the backlight 110 is disposed on the front side, the optical switching member 1 controls the amount of reflected light which is radiated from the backlight 110.

The light guide plate 120 has a substantially rectangular form, and the light-emitting diode 150 is provided as being opposed to a light incident surface 125, which is a side surface of the light guide plate 120. Reference numeral 160 denotes flexible printed circuits for electrical connection among a plurality of light-emitting diodes 150. The flexible printed circuits 160 and the control circuit 80 are electrically connected to each other by wiring 161.

Light that has entered the light guide plate 120 from the light incident surface 125 exits from the light exit surface 121, which is the front surface of the light guide plate 120. In a section between the light incident surface 125 and the light exit surface 121, a light entering portion 124 is provided, which has a role of efficiently transmitting the light from the light-emitting diode 150 to the light exit surface 121. The light entering portion 124 includes at least one (three in FIG. 1) light introducing portion 134 and a light non-introducing portion 135, which is a region sandwiched by the light introducing portions 134 or a region sandwiched by the light introducing portion 134 and an edge portion of the light guide plate 120. The light entering portion 124 is described in detail later.

Next, the optical switching member 1 is described. The optical switching member 1 includes two substrates, namely, a TFT substrate 2 and a color filter substrate 3, and a liquid crystal composition is sandwiched between the overlaid two substrates. The TFT substrate 2 has a plurality of pixel portions 8, and a pixel electrode 12 is provided in each pixel portion 8. The plurality of pixel portions 8 are aligned in a grid pattern in a display area 9. The pixel portions 8 function as optical switching elements for controlling an amount of transmitted light from the backlight 110 so as to function as pixels in the liquid crystal display device 100, to thereby form an image in the display area 9. Note that, in FIG. 1, only one pixel portion 8 is illustrated in order to evade complexity of the drawing.

FIG. 1 illustrates gate signal lines (also referred to as scanning line) 21 extending in an X direction of FIG. 1 and provided in parallel to each other in a Y direction of FIG. 1 and drain signal lines (also referred to as video signal line) 22 extending the Y direction and provided in parallel to each other in the X direction. The gate signal lines 21 and the drain signal lines 22 cross over with each other. The pixel portion 8 is formed in a region surrounded by the gate signal lines 21 and the drain signal lines 22.

A switching element 10 such as a thin film transistor (TFT) is provided in the pixel portion 8. Control signals are supplied from the gate signal line 21 to turn ON/OFF the switching element 10. When the switching element 10 is turned ON, a video signal transmitted via the drain signal line 22 is supplied to the pixel electrode 12.

The drain signal line 22 is connected to a drive circuit 5, and a video signal is output from the drive circuit 5. The gate signal line 21 is connected to a drive circuit 6, and a control signal is output from the drive circuit 6. The gate signal line 21, the drain signal line 22, and the drive circuits 5 and 6 are formed on the same TFT substrate 2. A configuration is also allowable in which the drive circuits 5 and 6 and the control circuit 80 are formed on the same semiconductor chip.

Note that, the liquid crystal driving system in the optical switching member 1 is not specifically limited. Any publicly-known system, such as a twisted nematic (TN) system, a vertical alignment (VA) system, or an in-plane switching (IPS) system, may be employed without any problem.

Figure 2A:
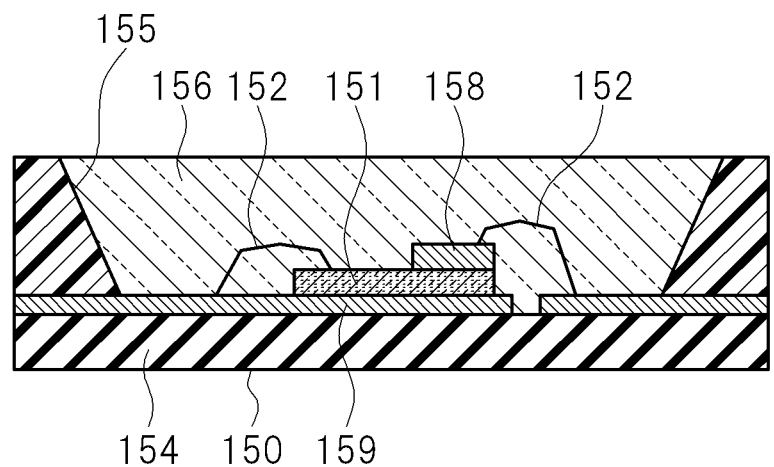
FIG. 2A is a schematic cross-sectional view illustrating a light-emitting diode as a light source.
Figure 2B:
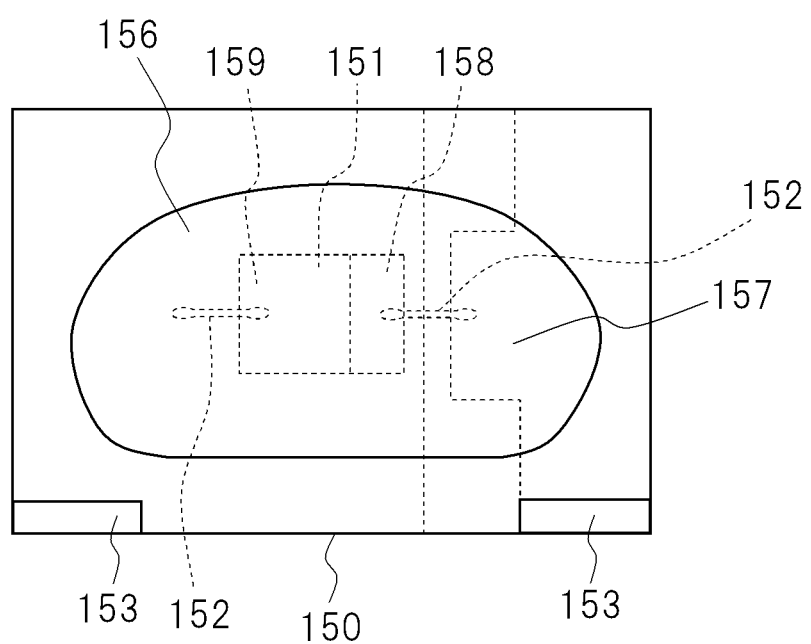
FIG. 2B is a front view of the light-emitting diode as the light source viewed from the light exit surface side.

FIGS. 2A and 2B are schematic views illustrating the light-emitting diode 150 as a light source. FIG. 2A is a schematic cross-sectional view illustrating the same, and FIG. 2B is a front view illustrating the light-emitting diode 150 viewed from the light exit surface side.

The light-emitting diode 150 has a structure in which a light-emitting diode chip 151 as a light-emitting portion is mounted on a chip substrate 154. The light-emitting diode chip 151 has a p-n junction, and when a voltage is applied to the p-n junction, light having a particular wavelength is emitted. A p electrode (anode) 158 is provided in a p-type semiconductor layer, and an n electrode (cathode) 159 is provided in an n-type semiconductor layer, those layers constituting the p-n junction.

A wire 152 is connected to each of the p electrode 158 and the n electrode 159. The wire 152 electrically connects a chip terminal 153 provided to connect the light-emitting diode 150 to the outside, to each of the p electrode 158 and the n electrode 159.

In some cases, a fluorescence emitting portion 156 may be provided on the light exit surface side of the light-emitting diode chip 151. The fluorescence emitting portion 156 has a function of converting a wavelength of light emitted from the light-emitting diode chip 151. A reflection portion 155 reflects light forward. A light exit surface 157 from which light exits is formed on a front side of the light-emitting diode 150.

Figure 3A:
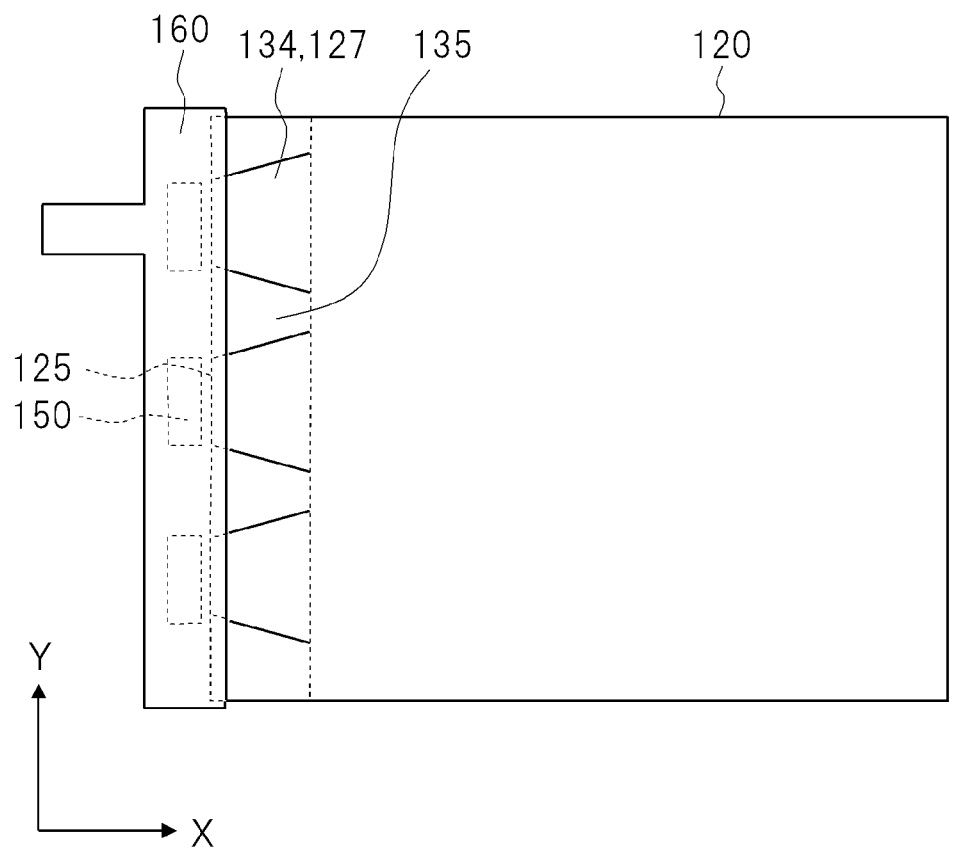
FIG. 3A is a schematic plan view of a light guide plate.
Figure 3B:
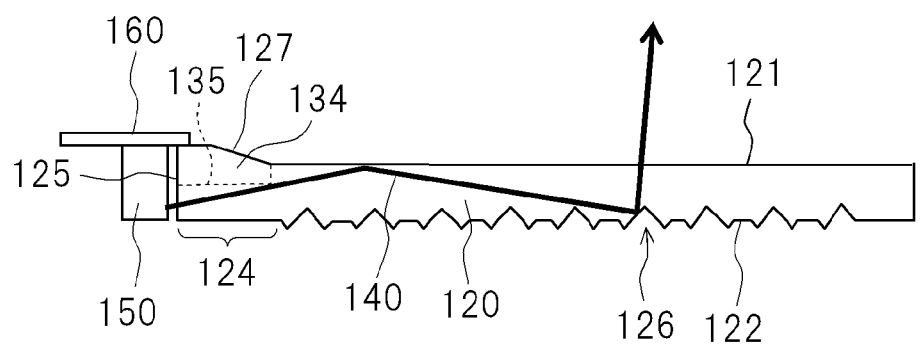
FIG. 3B is a schematic side view of the light guide plate.

FIGS. 3A and 3B are schematic views illustrating the light guide plate 120. FIG. 3A is a schematic plan view of the light guide plate 120 while FIG. 3B is a schematic side view of the same. In both of the figures, in order to show the positional relations, the light-emitting diode 150 and the flexible printed circuits 160 are also illustrated. The light guide plate 120 has a substantially rectangular form as illustrated in FIG. 3A, and has the light exit surface 121 as a front surface and a back surface 122 as illustrated in FIG. 3B. The light guide plate 120 is made of an optically transmissive thermoplastic material, such as polycarbonate or polymethylmethacrylate, and has a sheet-like form. The thickness of the light guide plate 120 may preferably be in the range from 1.0 mm to 0.1 mm. In this case, the thickness of the light guide plate 120 corresponds to a distance between the light exit surface 121 and the back surface 122.

In FIG. 3B, the cross section of the light guide plate 120 is substantially rectangular, and the thickness of the light introducing portion 134 included in the light entering portion 124 provided in the section between the light incident surface 125 and the light exit surface 121 is larger than the thickness of the light guide plate 120. Further, the inclined surface 127 in the top of the light introducing portion 134 connects the light incident surface 125 and the light exit surface 121 smoothly and continuously. Further, as illustrated in FIG. 3A, the inclined surface 127 has a fan-shaped form which widens in a direction away from the light-emitting diode 150 in the optical axis direction thereof (X direction of FIG. 3A) in plan view of the light guide plate 120. The structure of the light introducing portion 134 is described in detail later, but with this structure, light from the light-emitting diode 150 thicker than the light guide plate 120 may be effectively guided inside the light guide plate 120. Therefore, the thickness of the light incident surface 125 in the light introducing portion 134 is preferred to be substantially equal to the thickness of the light-emitting surface of the light-emitting diode 150. Meanwhile, the thickness of the light non-introducing portion 135 is smaller than the thickness of the light guide plate 120. This is mainly based on a manufacturing reason as described later. The structures of the light introducing portion 134 and the light non-introducing portion 135 are described in detail later.

FIGS. 3A and 3B illustrate positional relations among the light guide plate 120, the light-emitting diode 150, and the flexible printed circuits 160. The light incident surface 125 is provided on at least one side of the light guide plate 120, and a plurality of the light-emitting diodes 150 are provided at positions adjacent to the light incident surface 125. The light-emitting diodes 150 are arranged on the lower side of the flexible printed circuits 160 along the light incident surface 125.

An intermediate member such as a double sided adhesive tape (not shown) is provided on the light guide plate 120 side of the flexible printed circuits 160, and the light-emitting diode 150 is positioned with respect to the light incident surface 125 by adhering and fixing the flexible printed circuits 160 to the light guide plate 120.

Next, description is given of a light beam 140 radiated from the light-emitting diode 150 with reference to FIG. 3B. The light beam 140 radiated from the light-emitting diode 150 enters the light guide plate 120 from the light incident surface 125. The light guide plate 120 has a larger index of refraction than that of air, and hence the light beam 140 that has reached the light incident surface 125 at an angle larger than a specific angle with respect to the perpendicular direction of the light incident surface 125 is reflected, whereas the light beam 140 that has reached the light incident surface 125 at an angle smaller than the specific angle comes into the inside of the light guide plate 120.

The light exit surface 121 and the back surface 122 of the light guide plate 120 are substantially orthogonal to the light incident surface 125, respectively, and the light beam 140 coming into the inside of the light guide plate 120 propagates forward in the light guide plate 120 while being totally reflected on the light exit surface 121 and the back surface 122 of the light guide plate 120 repetitively. The back surface 122 is provided with a V-shaped groove 126 as a reflection portion. A part of the light beam 140 propagating in the light guide plate 120 is reflected toward the light exit surface 121 by the grooves 126 provided on the back surface 122, and exits through the light exit surface 121. The groove 126 is provided in a direction substantially orthogonal to the optical axis direction of the light-emitting diode 150.

Figure 4:
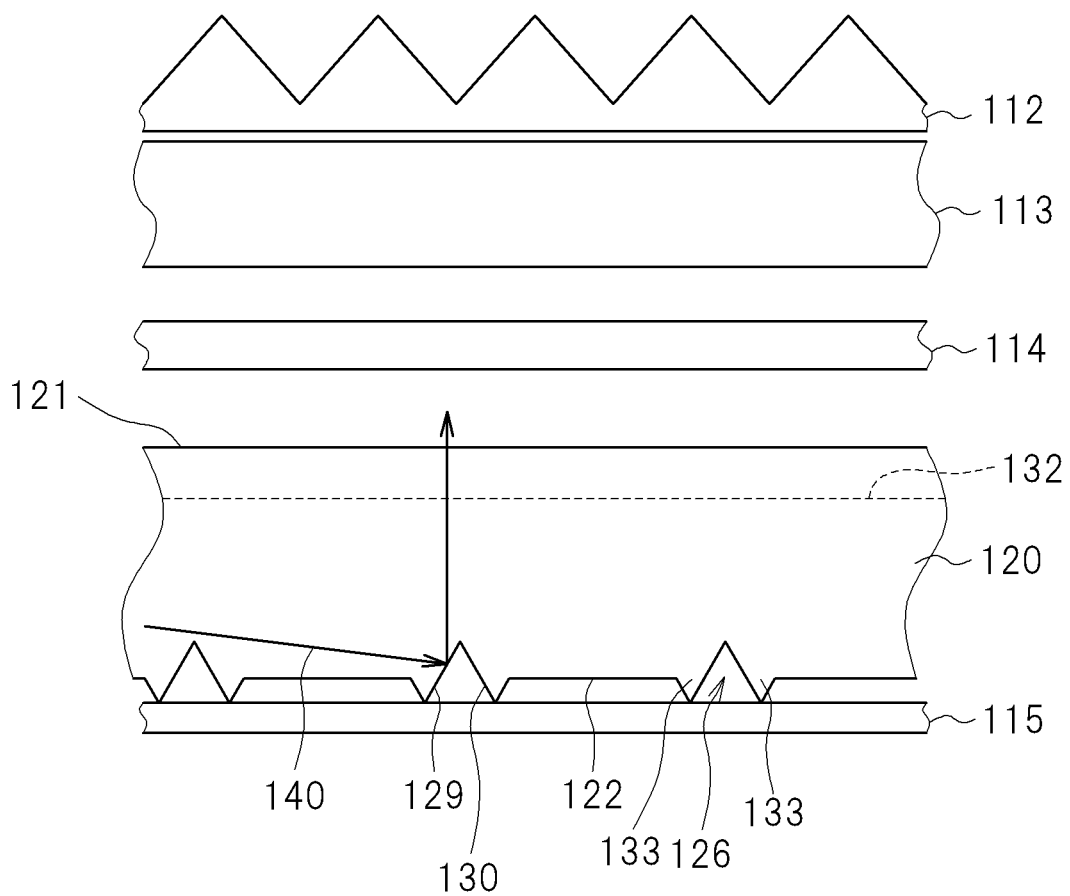
FIG. 4 is a view illustrating light reflected by a groove.

Next, description is given of the light beam 140 reflected by the groove 126 with reference to FIG. 4. FIG. 4 illustrates, in addition to the light guide plate 120, prism sheets 112 and 113, a diffusion plate 114, and a reflective sheet 115. Further, the light-emitting diode 150 is assumed to be provided on the left of FIG. 4. The groove 126 is a surface structure formed on the back surface 122 of the light guide plate 120, and includes a first light reflection plane 129 which faces the light-emitting diode 150 and a second light reflection plane 130 which is on a side opposite to the first light reflection plane 129. The first light reflection plane 129 and the second light reflection plane 130 are each inclined by 1 to 35 degrees with respect to the back surface 122. In this embodiment, the light beam 140 that has radiated from the light-emitting diode 150 and propagated in the light guide plate 120 is reflected mainly by the first light reflection plane 129 and an angle of the traveling direction of the light beam 140 is changed so that the light beam 140 may exit through the light exit surface 121. In other words, as described above, the light beam 140 propagates forward along the optical axis direction of the light-emitting diode 150 as being totally reflected repetitively in the light guide plate 120, and then the traveling direction of the light beam 140 is changed mainly by the first light reflection plane 129 to an angle at which the light beam 140 is allowed to exit, with the result that the light beam 140 exits through the light exit surface 121 of the light guide plate 120.

Note that, when the light-emitting diode 150 as a light source is additionally provided also on the right of FIG. 4, it is obvious that the second light reflection plane 130 functions similarly to the first light reflection plane 129.

Further, in this embodiment, the light exit surface 121 of the light guide plate 120 also has a groove 132 provided thereon. The groove 132 is a surface structure similar to the groove 126 of the back surface 122, and is formed substantially orthogonally to the groove 126. The groove 132 has a function of refracting the light beam 140 reflected by the first light reflection plane 129 toward the front side of the light guide plate 120. The light beam 140 radiated from the light guide plate 120 is diffused by the diffusion plate 114, and is changed its direction by the prism sheets 113 and 112 toward the front side of the light guide plate 120. The prism sheets 113 and 112 each are a transparent sheet having a triangular prism-shaped surface structure formed thereon, and are disposed such that the triangular prism-shaped surface structures are orthogonally oriented. The reflective sheet 115 reflects the light beam 140 that has been radiated from the light guide plate 120, toward the back surface of the light guide plate 120, to thereby introduce the light beam 140 into the light guide plate 120 again. Note that, the prism sheet 113 and the groove 132 are similar to each other in operational effect, and hence one of the prism sheet 113 and the groove 132 may be omitted when unnecessary.

Further, in this embodiment, the light guide plate 120 is thin and easily deformed. In view of this, projections 133 projected from the back surface 122 are formed on both sides of the groove 126, to thereby prevent intimate adhesion of the light guide plate 120 to the reflective sheet 115. With this configuration, there is produced an effect of suppressing unevenness in luminance distribution or light leakage, which may be caused otherwise when the light guide plate 120 is intimately adhered to the reflective sheet 115.

Figure 5:
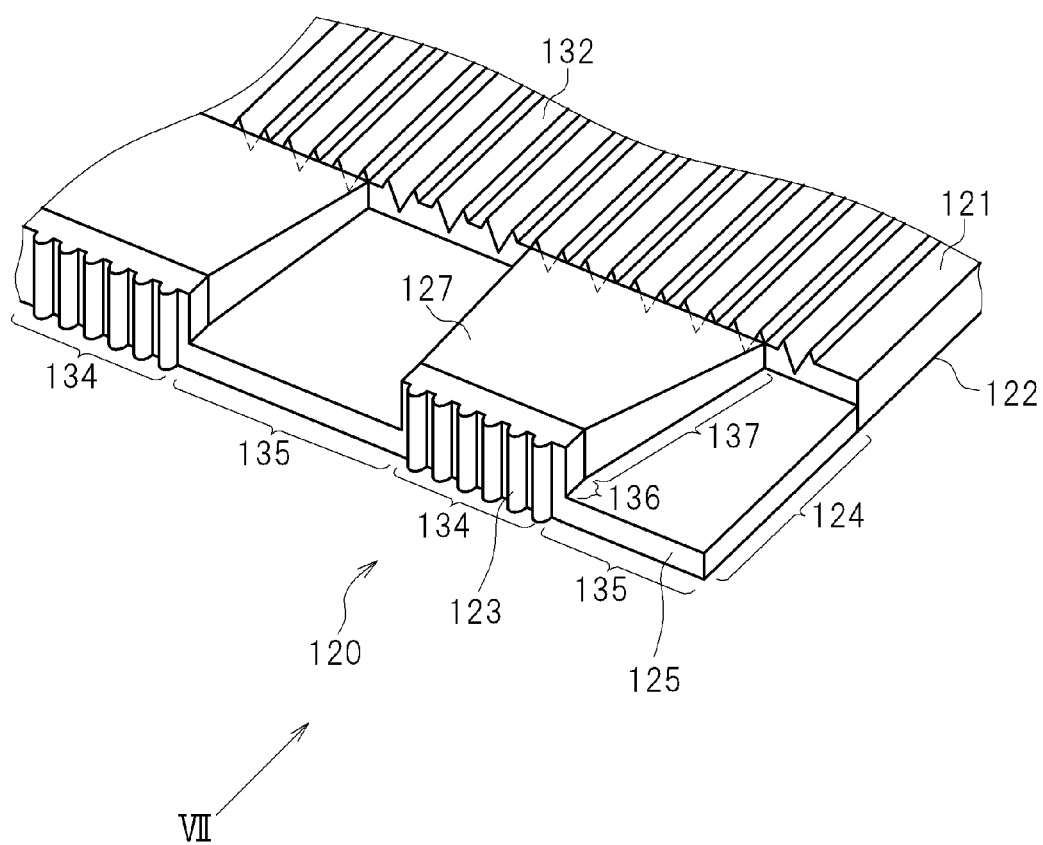
FIG. 5 is an enlarged perspective view of a light entering portion of the light guide plate.

Next, the structure of the light entering portion 124 of the light guide plate 120 is described in detail. FIG. 5 is an enlarged perspective view of the light entering portion 124 of the light guide plate 120.

In the light entering portion 124, the light introducing portion 134, which corresponds to a protruded portion when viewed from the light incident surface 125 side, and the light non-introducing portion 135, which corresponds to a recessed portion when viewed therefrom, are alternately formed. The light incident surface 125 has a concave-convex shape when viewed from a normal direction thereof. Note that, in this embodiment, the concave-convex shape described above is formed on the front side of the light guide plate 120, but instead, the concave-convex shape may be formed on the back side of the light guide plate 120. Further, as described above, the light introducing portion 134 has a thickness larger than the thickness of the light guide plate 120, and the light non-introducing portion 135 has a thickness smaller than the thickness of the light guide plate 120.

Figure 6A:
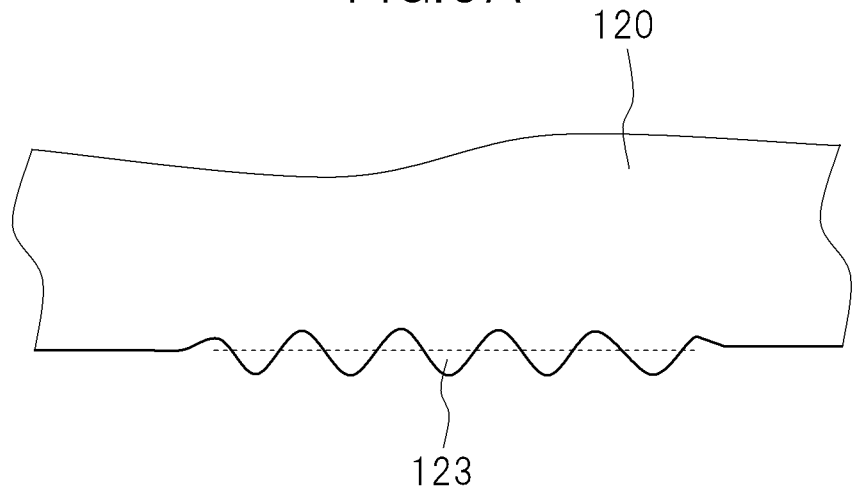
FIG. 6A is a view illustrating a lens having a cross section in a triangular shape.
Figure 6B:
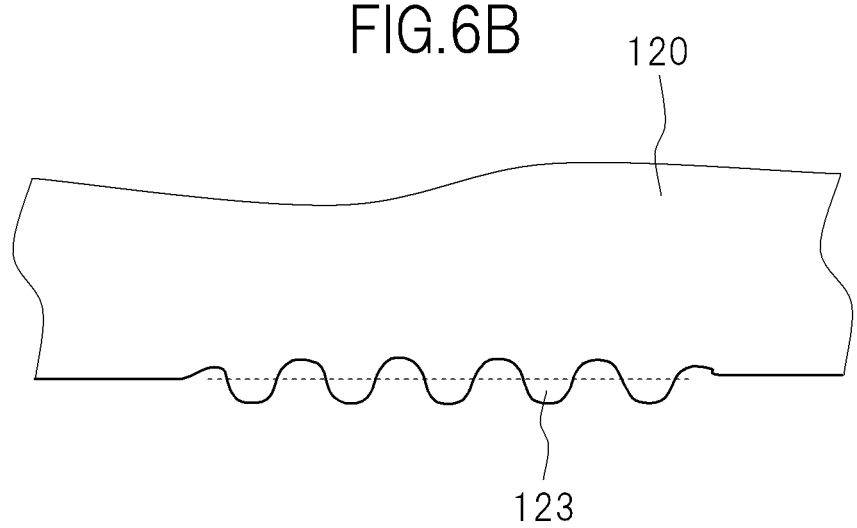
FIG. 6B is a view illustrating a lens having a cross section in a shape in which a plurality of semicircular cylindrical lenses are connected to one another.

Further, a lens 123 is provided in a portion of the light incident surface 125 corresponding to the light introducing portion 134. The lens 123 functions to refract light entering from the light introducing portion 134 so as to scatter the light, and to uniformly provide the incident light to the entire surface of the light guide plate 120. The lens 123 may be in various shapes, but is preferred to be in a shape drawn into the thickness direction of the light guide plate 120. The reason is that, as described later, when the light guide plate 120 is formed by being punched out from the sheet in the thickness direction, the lens 123 may be simultaneously formed. Therefore, the lens 123 is preferred to be formed in a shape which is easy to punch out, and examples of the lens 123 include a lens which is triangle in cross section as illustrated in FIG. 6A, and a lens formed of a plurality of semicircular cylindrical lenses connected to one another as illustrated in FIG. 6B. In view of the ease of fabrication, there may be preferably selected a lens with round corners, whereas the lens 123 may be in a shape of a general lenticular lens or in a shape with a sawtooth pattern.

Returning to FIG. 5, the light introducing portion 134 includes a first portion 136 and a second portion 137 from the light incident surface 125 in a direction away from the light source (that is, the optical axis direction). The first portion 136 has a form extending from the light incident surface 125 in the direction away from the light source while keeping a substantially constant width. Further, the second portion 137 extending from the first portion 136 has a form which widens in the direction away from the light source. Still further, the thickness of the first portion 136 is substantially constant along the direction away from the light source, whereas the thickness of the second portion 137 changes so as to smoothly continue from the first portion 136 to the light exit surface 121 which is the front surface of the light guide plate 120. In this embodiment, the front surface of the second portion 137 is the inclined surface 127 connecting the first portion 136 and the light exit surface 121. Note that, as in this embodiment, the entire front surface of the second portion 137 may be the inclined surface 127, or only a part thereof may be the inclined surface 127.

Figure 7:
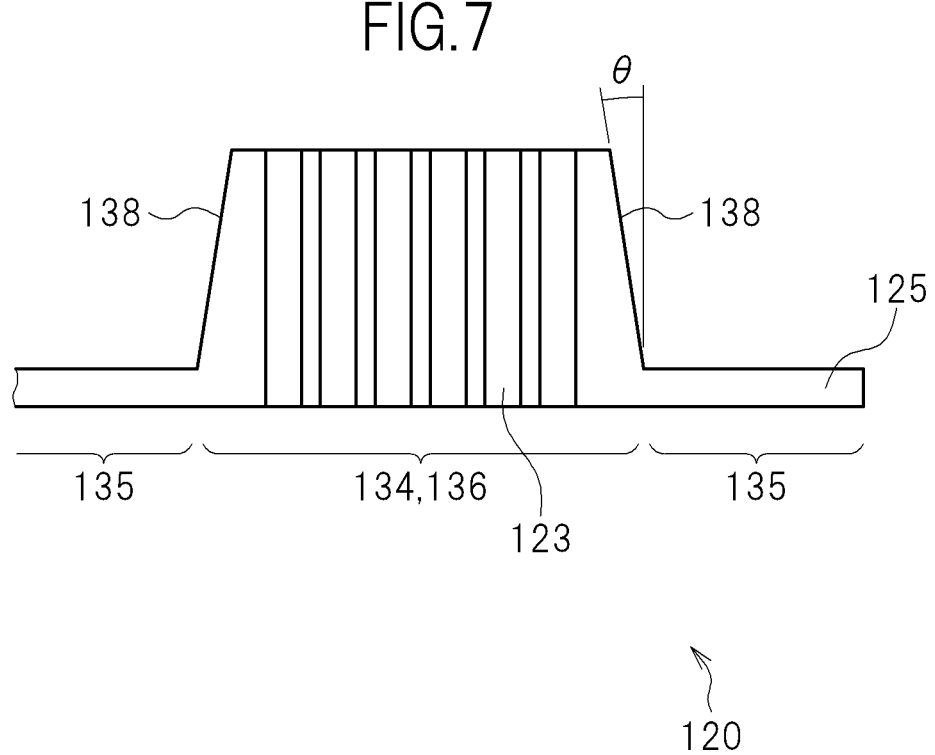
FIG. 7 is an enlarged front view including a first portion viewed from a direction indicated by the arrow VII of FIG. 5.

FIG. 7 is an enlarged front view including the first portion 136 viewed from a direction indicated by the arrow VII of FIG. 5. As illustrated in FIG. 7, the protruded portion in the light incident surface 125 corresponds to the first portion 136 of the light introducing portion 134. In this case, both side surfaces 138 of the first portion 136 are slightly inclined with respect to a direction toward the front surface of the light guide plate 120 (upward direction in FIG. 7). The direction of this inclination is a direction in which the width of the first portion 136 decreases toward the front surface direction of the light guide plate 120. Further, the angle θ of this inclination is preferably about 10 degrees or smaller, more preferably 5 degrees or smaller, and still more preferably between 1 degree to 2 degrees. This reason is that, if the angle θ is too large, the entered light beam is reflected toward the back side of the light guide plate 120, and hence it becomes difficult to obtain uniform lighting in the entire light guide plate 120. Meanwhile, a slight inclination is necessary to obtain a draft angle from the mold used when the first portion 136 is formed by thermal transfer as described later, and obtain a self aligning function in positioning when the light guide plate 120 is punched out from the sheet.

Next, a manufacturing method for the light guide plate 120 is described. The light guide plate 120 is formed of a sheet 170 made of a thermoplastic material having a thickness which is substantially equal to the thickness of the light guide plate 120. Steps thereof are sequentially described below with reference to FIG. 8.

In a first step, the sheet 170 made of the thermoplastic material is heated and softened (heating step). The heating temperature is preferred to be equal to or larger than a softening point of a resin forming the sheet 170, but is not limited as long as the heating temperature is a temperature which enables process by transfer described later. Further, the sheet 170 is larger in size than the light guide plate to be obtained in plan view. Further, the thickness of the sheet 170 is substantially equal to the thickness of the light guide plate to be obtained.

In a second step, a surface structure is transferred onto the sheet 170 by depressing a mold to the sheet 170 (transfer step). The mold is preferred to be a metallic mold made of a metal. The mold has a shape complementary to the groove 132 indicated by a line in FIG. 8 on the surface of the sheet 170, a portion 171 to be formed as the light introducing portion, and a portion 172 to be formed as the light non-introducing portion, so as to form those members. Therefore, the portion of the mold corresponding to the portion 172 to be formed as the light non-introducing portion has a protruded shape, and deforms the sheet 170 by crushing the sheet 170. Further, the portion of the mold corresponding to the portion 171 to be formed as the light introducing portion has a recessed shape, and deforms the sheet 170 so that a material at the portion where the sheet 170 is crushed flows therein to form a protrusion. Further, a portion 174 to be formed as the second portion of the portion 171 to be formed as the light introducing portion has the same shape as the second portion of the light guide plate to be obtained, but a portion 173 to be formed as the first portion thereof has a shape longer in the optical axis direction than the first portion of the light guide plate to be obtained. As described above, both the side surfaces of the portion 173 to be formed as the first portion are slightly inclined in a direction in which the width of the portion 173 decreases toward the front surface direction of the light guide plate. Note that, in this embodiment, description is made of a case where the groove 132 is simultaneously formed with the portion 171 to be formed as the light introducing portion and the portion 172 to be formed as the light non-introducing portion. In addition, the groove 126 (see FIG. 4) may also be simultaneously formed, or the groove 132 and the groove 126 may be formed in different steps from steps of forming the portion 171 to be formed as the light introducing portion and the portion 172 to be formed as the light non-introducing portion.

In a third step, the sheet 170 is removed from the mold (removing step). At this time, the sheet 170 may be cooled if necessary.

In a fourth step, the periphery of the sheet 170 is cut out, to thereby obtain the light guide plate (cutout step). The method of the cutout is preferred to employ a punching process using a cutout blade. The dotted line illustrated in FIG. 8 indicates a cutout line 175 for the punching process. The lens 123 is formed in this step. Further, in this embodiment, the punching process is employed as the cutout method, and hence the corners of the periphery of the light guide plate to be obtained are slightly rounded for the purpose of facilitating the process.

In this step, it is important to correctly align the position of the surface structure of the sheet 170 formed in the second step described above and the position relative to the cutout line 175 for cutting out the periphery. For this purpose, at an appropriate place on the periphery of the sheet 170, an alignment mark 176 for positioning is provided. However, the sheet 170 in this embodiment is very thin and easily deformed, and further, the accuracy of the cutout process such as the punching process is not always sufficiently high. Therefore, in the positioning using only the alignment mark 176, misalignment easily occurs particularly between the position of the surface structure of the sheet 170 in the portion 171 to be formed as the light introducing portion and the position relative to the cutout line 175.

Figure 9A:
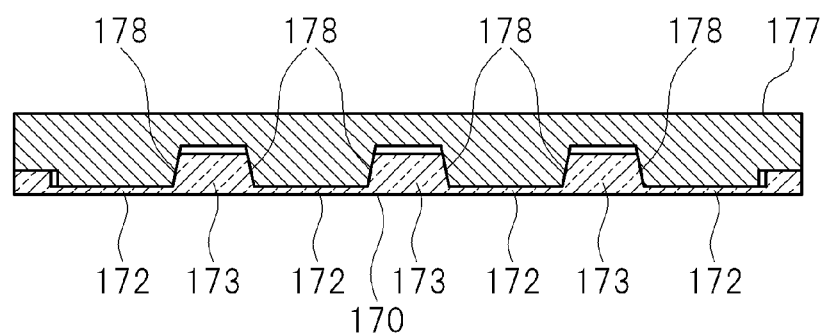
FIG. 9A is a cross-sectional view taken along the line IXA-IXA of FIG. 8, which illustrates a state during a cutout process.
Figure 9B:
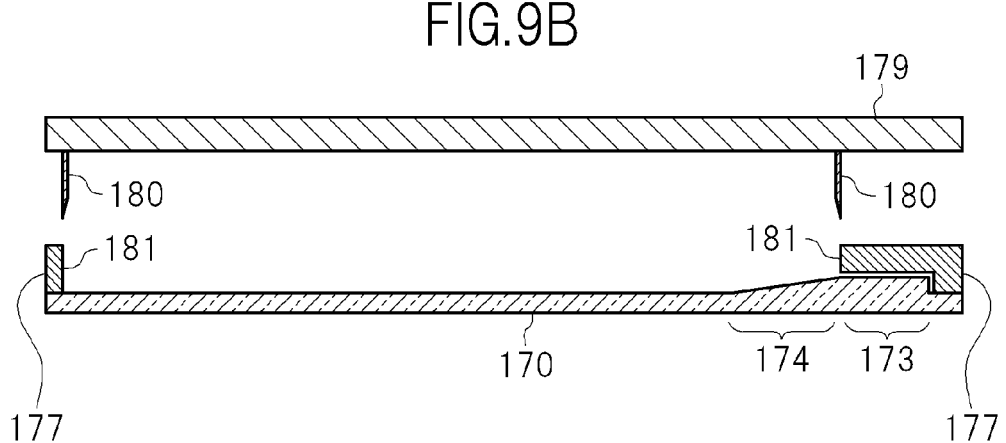
FIG. 9B is a cross-sectional view taken along the line IXB-IXB of FIG. 8, which illustrates the state during the cutout process.

Therefore, in this embodiment, the portion 173 to be formed as the first portion is used to perform mechanical positioning. This positioning is described with reference to FIGS. 9A and 9B. FIG. 9A is a cross-sectional view taken along the line IXA-IXA of FIG. 8, which illustrates a state during the cutout process. As illustrated in FIG. 9A, the sheet 170 is held so as to keep the sheet 170 still by a holding member 177, and under this state, the cutout is performed by a cutout blade. Portions of the holding member 177 corresponding to the portion 173 to be formed as the first portion and the portion 172 to be formed as the light non-introducing portion are formed in shapes complementary to those members. In particular, in portions of the holding member 177 corresponding to both the side surfaces 178 of the portion 173 to be formed as the first portion, inclined surfaces similar to the side surfaces 178 are formed. Therefore, when the sheet 170 is held by the holding member 177 from the front side, the positioning of the sheet 170 is automatically performed by causing the side surfaces 178 to be in contact with the complementary inclined surfaces. In other words, the sheet 170 has a self aligning function owing to the function of the side surfaces 178. With this, correct alignment may be performed between the position of the surface structure of the sheet 170 particularly in the portion 171 to be formed as the light introducing portion and the position relative to the cutout line 175. FIG. 9B is a cross-sectional view taken along the line IXB-IXB of FIG. 8, which illustrates the state during the cutout process. The sheet 170 is positioned by being held by the holding member 177, and is punched out under this state by a cutout blade 180 fixed to a cutoff tool 179. The planar positional relationship between the cutoff tool 179 and the holding member 177 are correctly maintained. In this embodiment, an inner surface 181 of the holding member 177 serves as a guide of the cutout blade 180, and hence the holding member 177 has an opening in a shape substantially equal to the cutout line 175 in FIG. 8. However, the guide by the inner surface 181 is not always necessary, and the opening of the holding member 177 may be larger than the cutout line 175.

Further, in FIG. 8, the cutout line 175 is set at a position which passes through the portion 173 to be formed as the first portion. This is because, if the cutout line 175 is set to pass through the portion 174 to be formed as the second portion, because the portion 174 to be formed as the second portion has a shape which widens in the direction away from the light source, when the position of the cutout line 175 is misaligned or inclined in the optical axis direction (up-and-down direction in FIG. 8), the shape of the light incident surface 125 (see FIG. 5) greatly changes. As in this embodiment, when the cutout line 175 is at a position which passes through the portion 173 to be formed as the first portion, because the portion 173 to be formed as the first portion extends in the direction away from the light source while keeping a substantially constant width, even if the position of the cutout line 175 is misaligned or inclined in the optical axis direction (up-and-down direction in FIG. 8), the shape of the light incident surface 125 (see FIG. 5) does not greatly change.

Note that, in manufacturing the light guide plate according to this method, the one light guide plate may be obtained from the one sheet, or the light guide plates may be cut out in large numbers from the one sheet, which is so-called multi-panel method. Alternatively, the light guide plate may be manufactured through batch processing from the sheet in a plate shape, or the sheet in a belt-like form may be wound off sequentially from a roll of raw sheet and the light guide plate may be manufactured therefrom in sequential processing. In such a case, an emboss roll may be employed as the mold.

Figure 10:
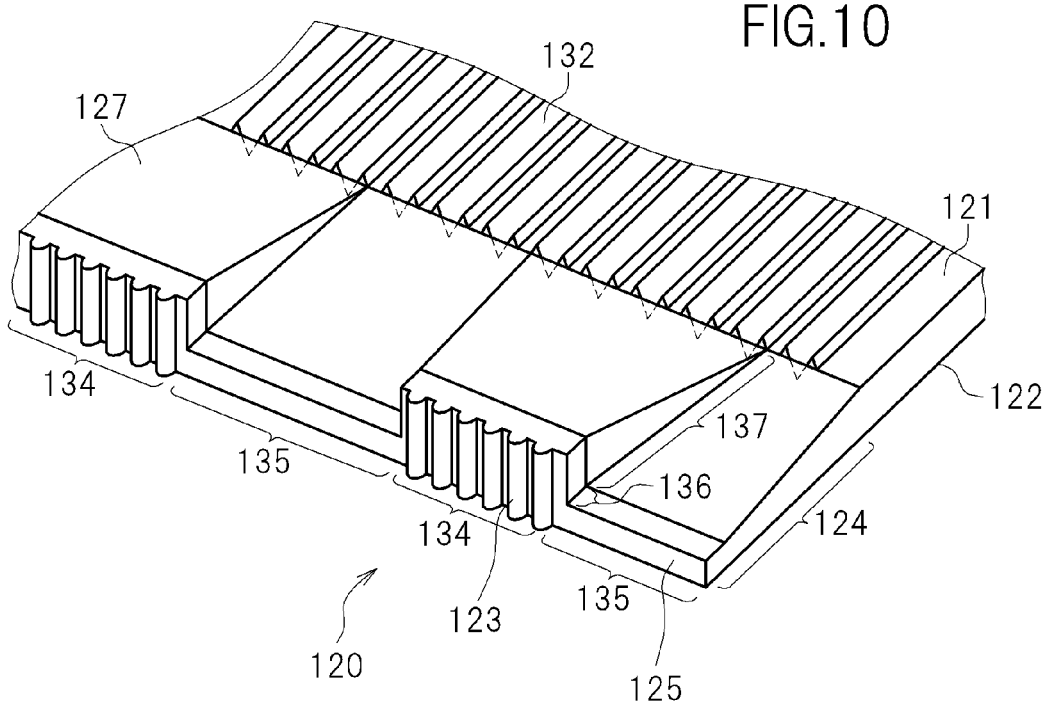
FIG. 10 is a view illustrating a modified example of the light entering portion.

FIG. 10 illustrates a modified example of the light entering portion 124. FIG. 10 illustrates an example where the front surface of the light non-introducing portion 135 is formed as an inclined surface that smoothly connects to the light exit surface 121.

Figure 11:
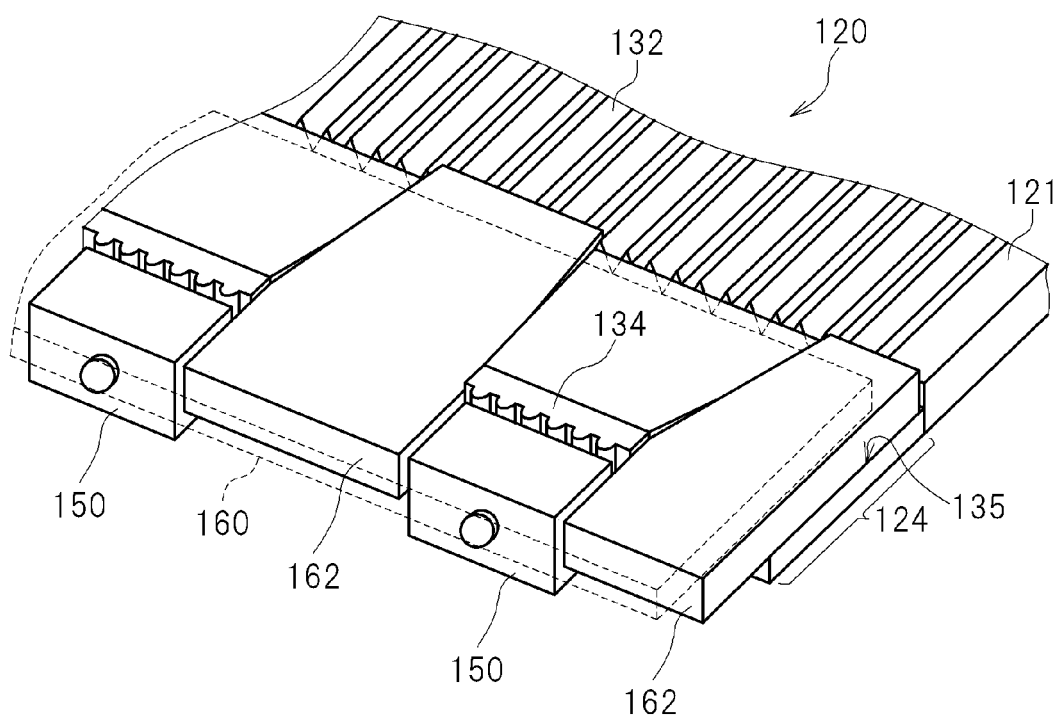
FIG. 11 is a view illustrating an installation structure for installing the light-emitting diode in the light guide plate.

Next, description is given of an installation structure for installing the light-emitting diode 150 in the light guide plate 120. FIG. 11 is a view illustrating an installation structure for installing the light-emitting diode 150 according to this embodiment in the light guide plate 120. The light-emitting diode 150 is attached to the back side of the flexible printed circuits 160, and disposed so as to be opposed to the light introducing portion 134. The flexible printed circuits 160 is fixed to the light guide plate 120 through an intermediate member 162. Note that, FIG. 11 illustrates merely an outline of the flexible substrate 160 by dashed lines for ease in understanding.

As illustrated in FIG. 11, the intermediate member 162 has a shape complementary to the front surface of the light non-introducing portion 135, and is fixed to the front surface of the light non-introducing portion 135 at the back surface thereof. Further, the intermediate member 162 is fixed, at the front surface thereof, to the flexible printed circuits 160. The thickness of the intermediate member 162 is preferred to be substantially equal to a difference between the largest thickness of the light introducing portion 134 and the thickness of the light non-introducing portion 135. With this configuration, there is no need to provide a fixing structure between the flexible printed circuits 160 and the light introducing portion 134, with the result that the thickness of the installation structure is reduced by the amount corresponding to the fixing structure.

Note that, in this embodiment, a double sided adhesive tape is employed as the intermediate member 162. However, the present invention is not limited thereto, and the intermediate member 162 may be made of any other appropriate material. Further, the intermediate member 162 may not be required to be uniform in thickness. In a case where the front surface of the light non-introducing portion 135 is an inclined surface as described above, the intermediate member 162 may be changed in thickness along the inclined surface. Still further, the flexible printed circuits 160 illustrated in FIG. 11 is in a rectangular form covering the light entering portion 124 and the light-emitting diode 150, but the present invention is not limited thereto. The flexible printed circuits 160 may be in any form as long as being capable of fixing the light-emitting diode 150 through the intermediate member 162.

Figure 12:
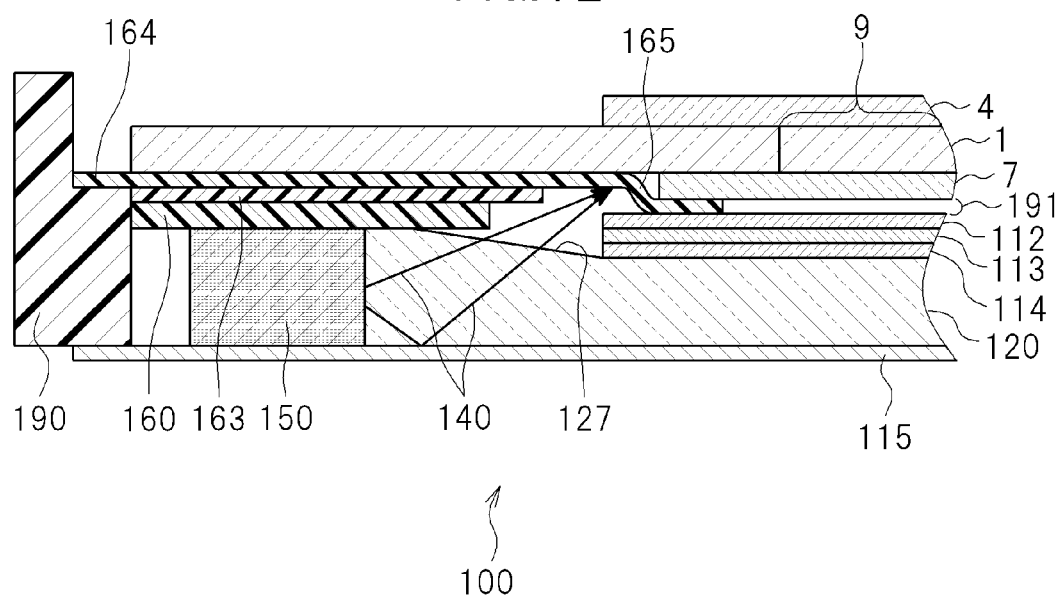
FIG. 12 is a cross-sectional view of the liquid crystal display device.

Further, description is given of a structure of a cross section of the liquid crystal display device 100 according to this embodiment. FIG. 12 is a cross-sectional view of the liquid crystal display device 100. FIG. 12 illustrates positional relations among the optical switching member 1, a polarizing plate 4 and a polarizing plate 7 attached to the front surface and the back surface, respectively, of the optical switching member 1, the light guide plate 120, the prism sheets 112 and 113 and the diffusion plate 114, which are optical sheets provided on the front surface of the light guide plate 120, the reflective sheet 115, the light-emitting diode 150, and the flexible substrate 160. The optical switching member 1 and the flexible substrate 160 are received by the housing 190 through a light blocking member 164. A spacer 163 may be inserted between the light blocking member 164 and the flexible substrate 160 as necessary, and a space 191 of a predetermined width is provided at a position corresponding to the display area 9.

The light blocking member 164 has a function of preventing light from entering the display area 9 from outside, and may preferably employ a double sided adhesive tape in black. The light blocking member 164 is in a square frame-like form in plan view, and fixes the optical switching member 1 and the light guide plate 120 along the entire periphery thereof to the housing 190. In this embodiment, the light blocking member 164 has an extending portion 165 which is extended like a tongue from a position corresponding to the light-emitting diode 150 in the optical axis direction of the light-emitting diode 150. Then, the extending portion 165 is warped downward in a direction away from the optical switching member 1 on the back surface side thereof, and fixed to the prism sheet 112 as illustrated in FIG. 12. In other words, the extending portion 165 is indirectly fixed to the light guide plate 120 through the prism sheets 112 and 113, and the diffusion plate 114. Alternatively, the extending portion 165 may directly be fixed to the light guide plate 120. Further, the opposite surface, that is, the front surface of the extending portion 165 may be or may not be fixed to the polarizing plate 7.

When the extending portion 165 as describe above is provided, as illustrated in FIG. 12, the light beam 140 radiated from the light-emitting diode 150 and leaked out on the front side from the inclined surface 127 is blocked by the extending portion 165 and does not reach the display area 9. However, in a case where the light beam 140 leaked from the inclined surface 127 on the front side does not cause a problem in quality, the extending portion 165 is not always necessary, and therefore, the extending portion 165 and the spacer 163 may be omitted without any problem.

While there have been described what are at present considered to be certain embodiments of the invention, it will be understood that various modifications may be made thereto, and it is intended that the appended claims coverall such modifications as fall within the true spirit and scope of the invention.

What is claimed is:

1. A liquid crystal display device, comprising:
   an optical switching member which includes a first substrate and a second substrate sandwiching a liquid crystal layer;
   a light guide plate made of a thermoplastic material, which is disposed on a back side of the optical switching member and includes at least one light introducing portion on at least one side surface thereof; and
   a light source disposed on the at least one side surface of the light guide plate, wherein:
   the at least one light introducing portion includes, in plan view of the light guide plate:
      a first portion extending from a light incident surface, which is an end surface of the at least one light introducing portion, in a direction away from the light source while keeping a substantially constant width; and
      a second portion, which extends from the first portion and has a form which widens in the direction away from the light source; and
   at least the second portion is connected to a front surface of the light guide plate through an inclined surface which is smoothly continuous with the front surface of the light guide plate.

2. The liquid crystal display device according to claim 1, wherein the first portion has a side surface inclined in a direction in which a width of the first portion decreases toward the front surface direction of the light guide plate.

3. The liquid crystal display device according to claim 1, wherein the first portion has a thickness which is substantially constant.

4. The liquid crystal display device according to claim 1, wherein:
   the at least one light introducing portion comprises a plurality of light introducing portions; and
   the liquid crystal display device further comprises a light non-introducing portion provided in one of a portion sandwiched by the plurality of light introducing portions and a portion sandwiched by one of the plurality of light introducing portions and an edge portion of the light guide plate, the light non-introducing portion being thinner than the light introducing portion.

* * * * *